United States Patent
Gipson et al.

(10) Patent No.: US 12,222,063 B2
(45) Date of Patent: *Feb. 11, 2025

(54) MOVABLE STAND ASSEMBLY AND METHOD OF USE

(71) Applicant: Brunson Instrument Company, Kansas City, MO (US)

(72) Inventors: Isaac Gipson, Lee's Summit, MO (US); Deighton Brunson, Lee's Summit, MO (US); Mark Meuret, Overland Park, KS (US); Eli Stack, Lee's Summit, MO (US); Adam Warden, Lee's Summit, MO (US)

(73) Assignee: BRUNSON INSTRUMENT COMPANY, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,604

(22) Filed: May 15, 2023

(65) Prior Publication Data

US 2023/0400144 A1 Dec. 14, 2023

Related U.S. Application Data

(63) Continuation of application No. 16/925,113, filed on Jul. 9, 2020, now Pat. No. 11,649,923.

(Continued)

(51) Int. Cl.
*F16M 11/42* (2006.01)
*B60B 33/00* (2006.01)
(Continued)

(52) U.S. Cl.
CPC ............. *F16M 11/42* (2013.01); *F16M 11/26* (2013.01); *B60B 33/00* (2013.01); *B62B 5/0457* (2013.01);
(Continued)

(58) Field of Classification Search
CPC ..... B60B 33/066; B60B 33/00; B62B 5/0433; B62B 5/0438; B62B 5/0457; B62B 5/049;
(Continued)

(56) References Cited

U.S. PATENT DOCUMENTS

| 1,007,022 A | 10/1911 | Doll |
| 2,783,055 A | 2/1957 | Michaud |

(Continued)

FOREIGN PATENT DOCUMENTS

| BE | 544909 A | 2/1956 |
| EP | 3997377 | 5/2022 |

(Continued)

OTHER PUBLICATIONS

"Extended European Search Report Received for European Patent Application No. 20837888.5, Search completed on Jun. 20, 2023, Mailed on Jul. 3, 2023."

(Continued)

*Primary Examiner* — Tan Le
(74) *Attorney, Agent, or Firm* — Kutak Rock LLP; Brian L. Main

(57) ABSTRACT

A stand assembly and method of converting a stand assembly from a moveable configuration to a stationary configuration is provided. The stand assembly includes a plurality of wheel assemblies slidably engaged with a plurality of respective trivets, each wheel assembly being moveable between a stowed configuration and a deployed configuration, thereby moving each trivet between a deployed configuration and a stowed configuration, respectively. When in their respective deployed configurations, a distal end of each trivet is engaged with the floor, thereby causing the stand assembly to be in the stationary configuration. When in their respective stowed configurations, the distal end of each trivet is positioned between two wheels of the wheel assem- (Continued)

bly such that the wheel assembly prevents the trivet from engaging with objects on the floor, thereby minimizing adjustments required to obtain desired ground clearance.

20 Claims, 9 Drawing Sheets

Related U.S. Application Data

(60) Provisional application No. 62/872,104, filed on Jul. 9, 2019.

(51) Int. Cl.
  *F16M 11/26* (2006.01)
  *B62B 5/04* (2006.01)
  *F16M 11/18* (2006.01)

(52) U.S. Cl.
  CPC ......... *F16M 11/18* (2013.01); *F16M 2200/08* (2013.01)

(58) Field of Classification Search
  CPC ........ F16M 11/18; F16M 11/26; F16M 11/42; F16M 2200/08
  See application file for complete search history.

(56) References Cited

U.S. PATENT DOCUMENTS

| | | |
|---|---|---|
| 6,591,449 B1 | 7/2003 | Parkin |
| 7,077,369 B2 | 7/2006 | Hardin |
| 9,057,481 B1* | 6/2015 | Chapman ............ F16M 11/2014 |
| 11,649,923 B2* | 5/2023 | Gipson .................. F16M 11/42 248/127 |
| 2004/0195789 A1 | 10/2004 | Christensen |
| 2005/0017138 A1 | 1/2005 | Hardin |
| 2006/0103092 A1 | 5/2006 | Strahler et al. |
| 2009/0174162 A1 | 7/2009 | Gass et al. |
| 2012/0024329 A1 | 2/2012 | Ma |
| 2016/0258573 A1* | 9/2016 | Goldish ............. A63B 22/0005 |
| 2019/0064869 A1 | 2/2019 | Hudlemeyer et al. |
| 2019/0185182 A1 | 6/2019 | Bei et al. |
| 2021/0010634 A1 | 1/2021 | Gipson et al. |
| 2023/0159072 A1* | 5/2023 | Bernal .................... B66F 7/065 280/638 |

FOREIGN PATENT DOCUMENTS

| | | |
|---|---|---|
| JP | 2010-076471 A | 4/2010 |
| WO | 2021007450 A1 | 1/2021 |

OTHER PUBLICATIONS

"Final Office Action Received for U.S. Appl. No. 16/925,113, mailed on Dec. 7, 2021."
"International Preliminary Report on Patentability for International Application PCT/US2020/041435, Report issued Jan. 11, 2022, Mailed on Jan. 20, 2022."
"International Search Report and Written Opinion received for International Application No. PCT/US2020/041435, Search completed on Oct. 19, 2020, mailed on Oct. 20, 2020."
"Non- Final Action received for U.S. Appl. No. 16/925,113, Mailed on Aug. 19, 2021".
"Non-Final Action received for U.S. Appl. No. 16/925,113, Mailed on Jun. 17, 2022."
"Notice of Allowance received for U.S. Appl. No. 16/925,113, Mailed on Jan. 11, 2023"
"Restriction Requirement Received for U.S. Appl. No. 16/925,113, mailed on Apr. 1, 2021."

\* cited by examiner

MOVABLE STAND ASSEMBLY AND METHOD OF USE

CROSS-REFERENCE TO RELATED APPLICATIONS

This application is a continuation application of U.S. patent application Ser. No. 16/925,113, filed Jul. 9, 2020, now U.S. Pat. No. 11,649,923, which claims priority pursuant to 35 U.S.C. 119(e) to U.S. Provisional Patent Application Ser. No. 62/872,104, filed Jul. 9, 2019, the entire disclosures of which are incorporated herein by reference.

FIELD OF THE INVENTION

The present invention relates generally to movable stand assemblies. More specifically, the present invention is concerned with stand assemblies having improved ground clearance.

BACKGROUND

Movable stands of the prior art generally include a base having a plurality of spaced-apart wheels, such as caster wheels or the like. In this way, the stand can be wheeled from place to place, such as across a flat surface (the "ground"). Unfortunately, cords and other low-lying objects can prevent or otherwise hinder such movement. Accordingly, it would be beneficial to have a moveable stand that has sufficient ground clearance to avoid low-lying objects.

Many stands of the prior art include one or more locking feature for moving one or more wheel from an unlocked configuration to a locked configuration, thereby moving the stand from a moveable configuration to a stationary configuration. Unfortunately, the process for locking the wheels can be tedious and unreliable. Furthermore, locked wheels can provide an unstable and/or otherwise unreliable means of retaining the stand in a stationary configuration. For instance, even a locked wheel can be somewhat prone to movement. Furthermore, wheels made of hard materials (such as plastic, metal, and the like) generally provide poor resistance to lateral movement along a support surface (due to a relatively small engagement area associated with the tangential orientation of the support surface to the curvature of the wheel) while softer wheel materials (such as rubber and the like) tend to provide varying levels of vertical support (due to compression of such material at the engagement area, thereby changing the surface area of the engagement area). Accordingly, it would be beneficial to have a stand that is moveable to a stationary configuration without requiring the wheels to be locked.

Many stands of the prior art include one or more feature for disengaging one or more wheel from the ground, thereby moving the stand from a moveable configuration to a stationary configuration. Unfortunately, existing systems fail to provide a satisfactory solution for wheel disengagement while maintaining desirable ground clearance. Accordingly, it would be beneficial to have a system that provides a satisfactory solution for wheel disengagement while maintaining desirable ground clearance.

SUMMARY

The present invention comprises a moveable stand that has sufficient ground clearance to avoid low-lying objects. When required or desired, the stand of the present invention is moveable to a stationary configuration without requiring the wheels to be locked. In so doing, the present invention provides a satisfactory solution for wheel disengagement while maintaining desirable ground clearance.

Certain embodiments of the present invention include a wheel assembly that moves relative to a respective trivet, thereby moving the wheel assembly between a deployed configuration and a stowed configuration. When the wheel assembly is in the stowed configuration, a distal end of the trivet is engaged with the floor, thereby allowing the wheel to be disengaged from the floor and/or minimizing the effects of the wheels engagement with the same. When the wheel assembly is in the deployed configuration, the distal end of the trivet is positioned relative to the wheel assembly such that wheel(s) of the wheel assembly prevent, or otherwise inhibit, the distal end of the trivet from engaging with objects on the floor.

The present invention further includes a method of moving a stand from a stationary configuration to a moveable configuration. The method includes causing trivets of the stand assembly to disengage from the floor and further includes causing a distal end of each trivet to be positioned between wheels of a respective wheel assembly such that the wheel assembly prevents or otherwise hinders engagement of the trivet with objects on the floor. In this way, necessary or desired ground clearance for moving the stand assembly along the floor is obtained with minimal adjustments of the stand assembly being required for obtaining such ground clearance.

The present invention further includes a method for leveling a stand while in the stationary configuration by adjusting the position of one or more trivets relative to the wheel assembly.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

Preferred embodiments of the invention are set forth in the following description and are shown in the drawings and are particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
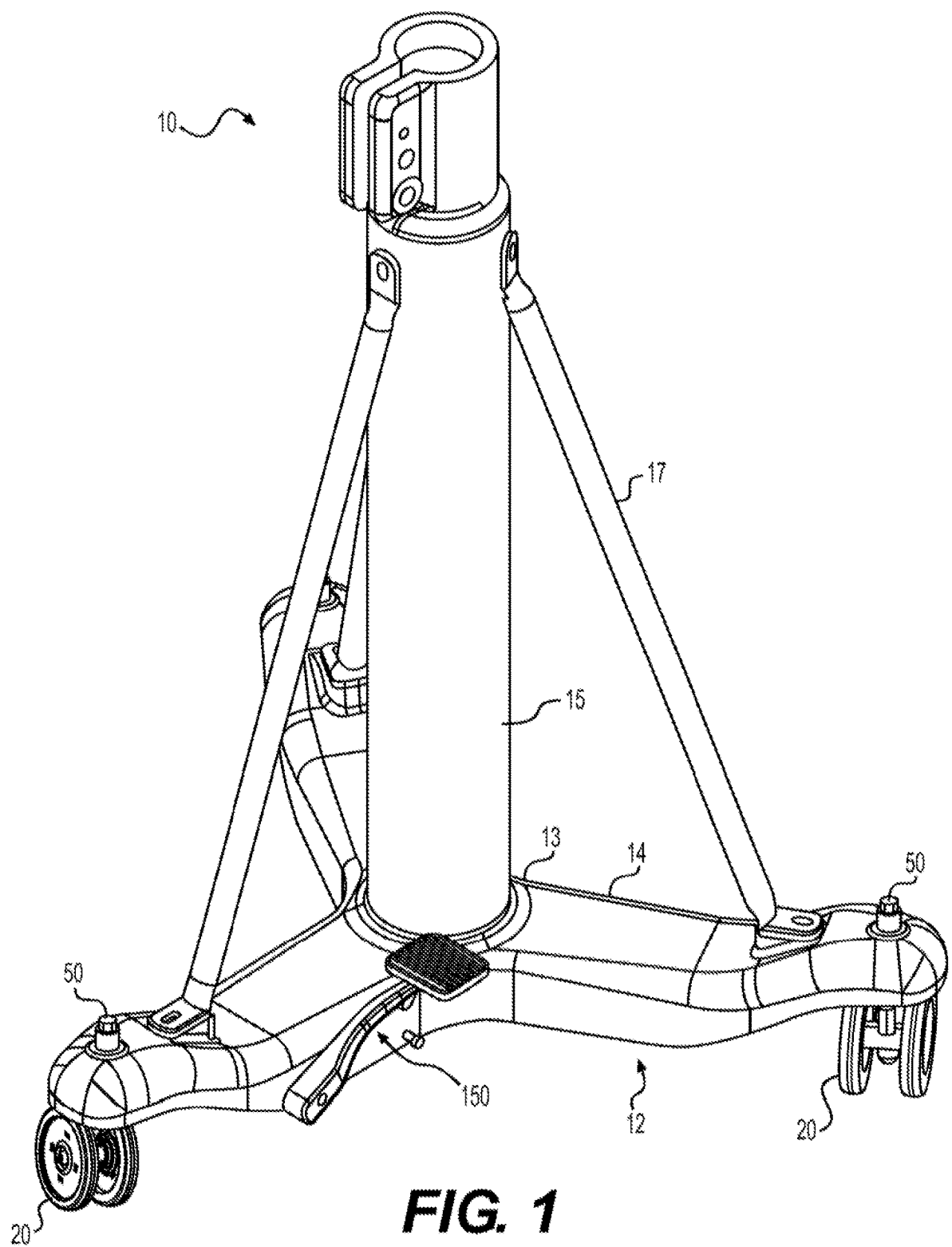
FIG. 1 is an isometric view of a stand assembly of the present invention.

Referring to FIG. 1, certain embodiments of the present invention include a stand assembly 10 having a base 12 and a vertical stanchion 15 extending vertically therefrom. In the embodiment shown, the base 12 includes a center hub 13 and three equally-spaced base arms 14 extending therefrom. In some embodiments, the stand assembly has more than 3 radially symmetrically-spaced base arms 14. Each base arm 14 includes a respective proximal end secured to the center hub 13 and a respective distal end displaced generally horizontally therefrom, while the vertical stanchion 15 includes a proximal end secured to the center hub 13 of the base 12 and a distal end displaced vertically therefrom. In this way, the stand assembly provides a stable means of supporting objects above a surface (the "floor").

In some embodiments, the stand assembly includes one or more brace member 17 such as the diagonal braces 17 shown in FIG. 1. In the embodiment shown, each brace member 17 includes opposed first and second ends, the first end of each brace member 17 being coupled to the vertical stanchion 15 and the second end of each brace member being coupled to a respective base arm 14. In this way, the brace members 17 increase rigidity of the stand assembly 10. In some embodiments, each base arm 14 defines a respective engagement feature for facilitating securement of a respective brace member 17 to the same. In some embodiments, the engagement feature is a platform (shown in FIG. 1), a recessed area (shown in U.S. Design Application No. 29/677,944, the entire disclosure of which is incorporated herein by reference), or any other engagement feature now known or later developed.

Still referring to FIG. 1, the stand assembly 10 of the present invention includes a plurality of wheel assemblies 20 and a plurality of corresponding trivets 50. In some embodiments, a wheel assembly 20 is positioned at or near a distal end of each base arm 14. In some such embodiments, one or more base arm 14 includes a raised portion, such as a raised "clawfoot" distal end. In this way, the base 12 is configured to accommodate wheel assemblies having large wheel diameters (such as, e.g., 5 inches or more) while maintaining an overall height for the base 12 (as measured at the center hub 13 or similar region) that is similar to (or even lower than) an overall height of traditional bases associated with wheel assemblies having smaller wheel diameters (such as, e.g., 2.5 inches or less).

Figure 2:
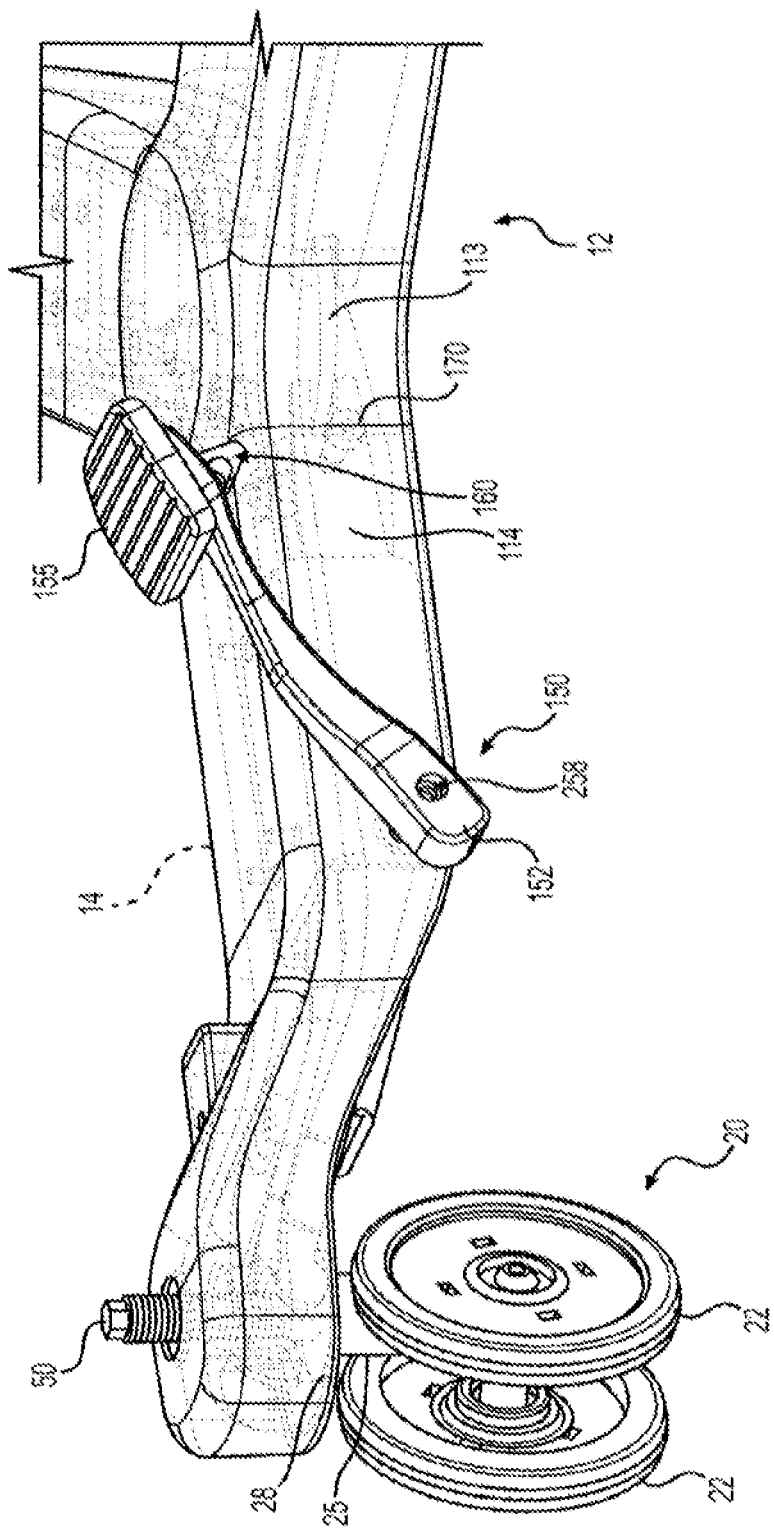
FIG. 2 is an isometric view of a portion of the stand assembly, the stand assembly shown with the vertical stanchion and the brace members being removed for clarity and the base being outlined in broken lines shown in a transparent state.
Figure 3:
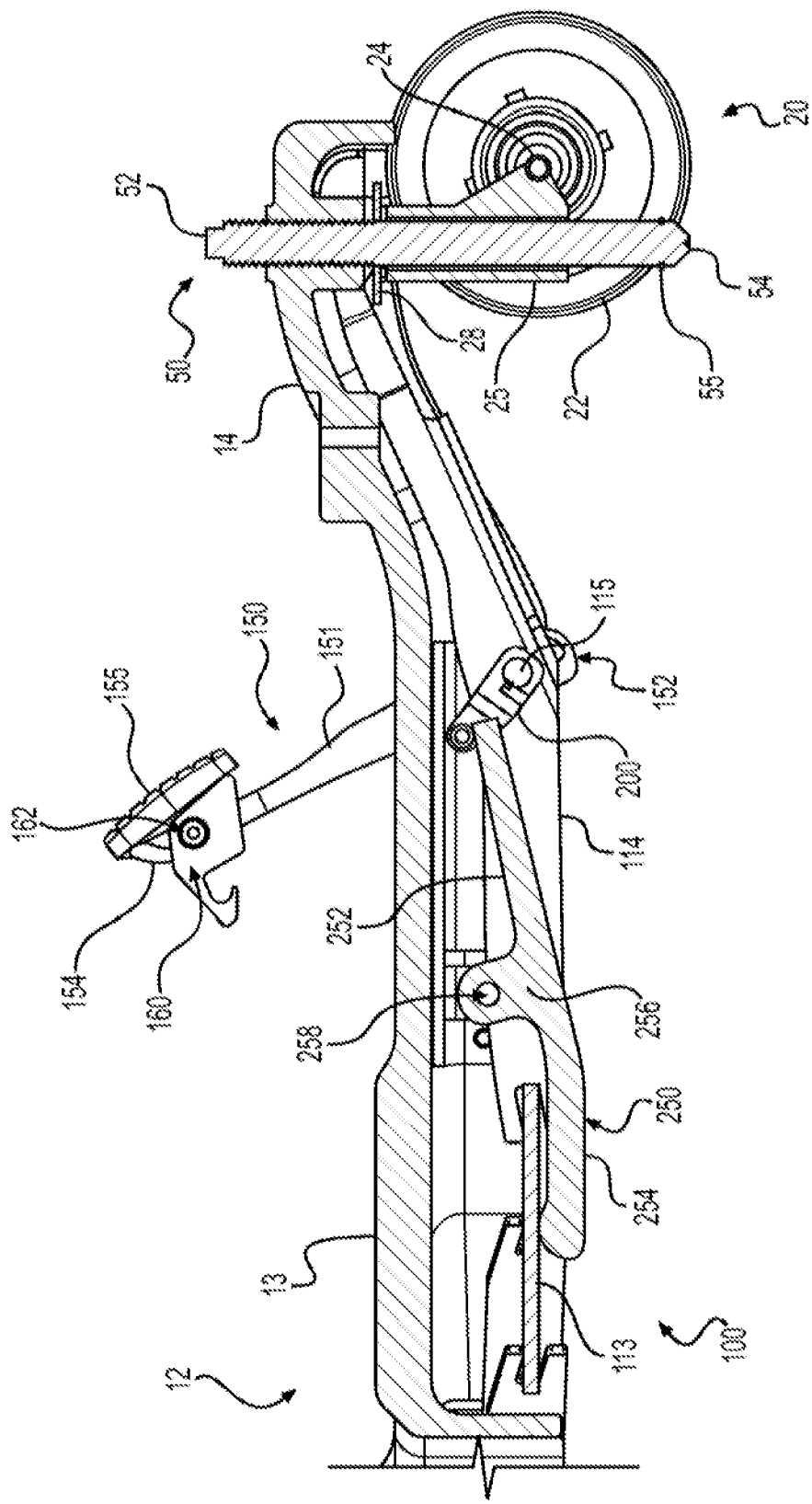
FIG. 3 is a sectional view of the portion of the stand assembly shown in FIG. 2, the wheel assembly and the trivet being shown in a stowed configuration and a deployed configuration, respectively.
Figure 9:
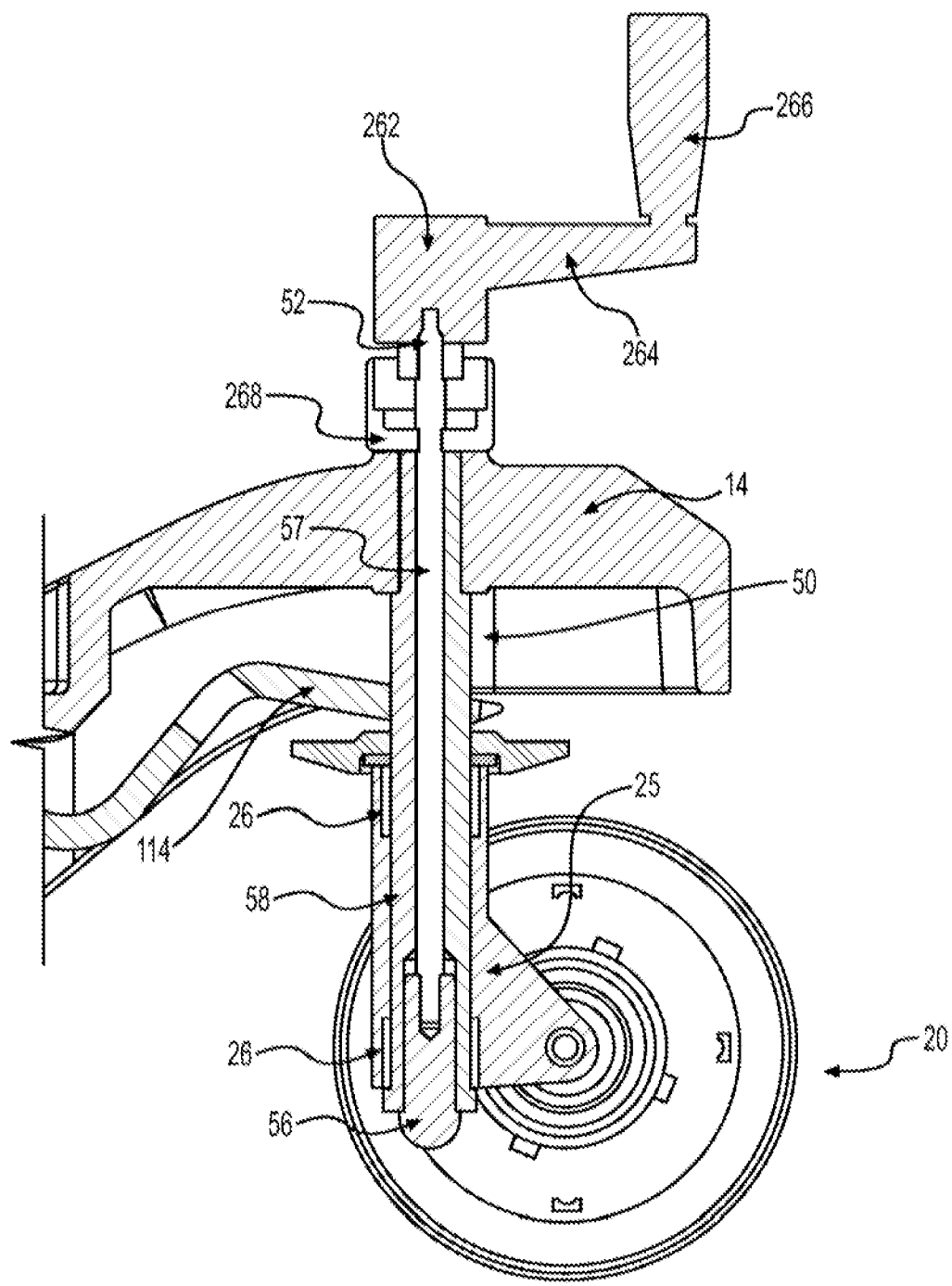
FIG. 9 is a partial view of the sectional view of FIG. 8 shown on an enlarged scale, the wheel assembly and the trivet being shown in a deployed configuration and a stowed configuration, respectively, showing the leveling crank and handle.
Figure 10:
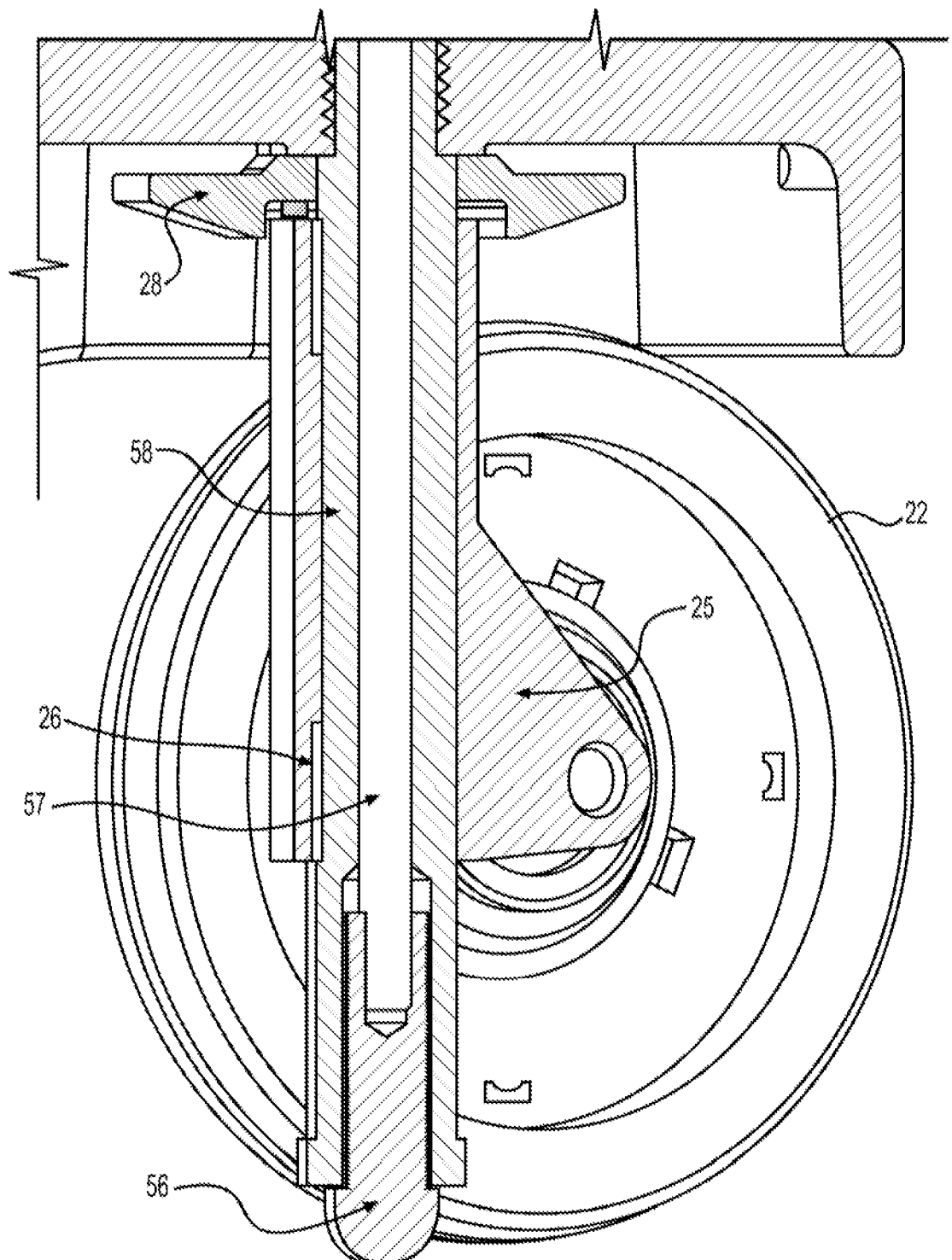
FIG. 10 is a partial view of the sectional view of FIG. 9 shown on an enlarged scale, the wheel assembly and the trivet being shown in a stowed configuration and a deployed configuration, respectively.

Referring to FIGS. 2 and 3, each wheel assembly 20 of the embodiment shown includes one or more wheels, preferably a pair of spaced apart wheels 22, a carriage 25 positioned therebetween or therenext, and an axle 24 extending from the carriage to each wheel 22. The carriage 25 is slidably engaged with the trivet 50 such that the wheel assembly 20 is moveable between a deployed configuration (shown in FIG. 9) and a stowed configuration (shown in FIG. 10). In the deployed configuration, the wheels 22 of the wheel assembly 20 are engaged with the floor such that the stand assembly 10 is movable along the floor. In some embodiments, the wheel assembly is moveable from the deployed configuration to the stowed configuration by sliding the carriage 25 along the trivet 50 until a distal end 54 of the trivet engages with the floor, thereby moving the trivet from a stowed configuration to a deployed configuration. In this way, movement of the wheel assembly 20 from its deployed configuration (as shown in FIG. 9) to its stowed configuration (as shown in FIG. 10) causes the trivet 50 to simultaneously move from its stowed configuration to its deployed configuration.

In the embodiment shown, the stand assembly 10 is movable from a movable configuration to a stationary configuration by moving each of the wheel assemblies 20 from a respective deployed configuration to a respective stowed configuration. In some embodiments, the wheels 22 of the wheel assembly 20 remain engaged with the floor when the wheel assembly is in its stowed configuration. In other embodiments, wheels 22 of at least some of the wheel assemblies 20 are displaced from the floor when the wheel assembly 20 is in its stowed configuration.

Figure 4:
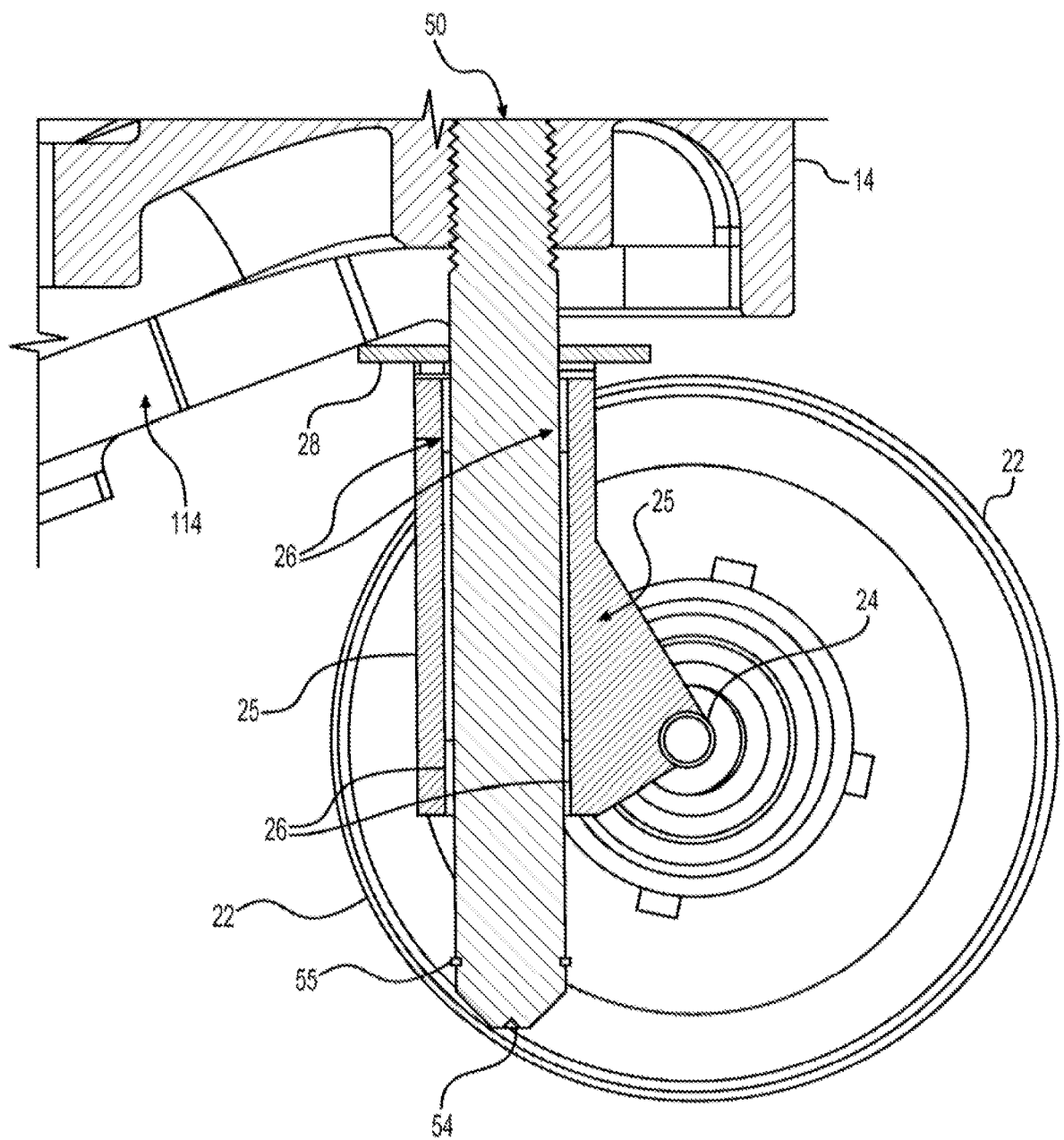
FIG. 4 is a partial view of the sectional view of FIG. 3 shown on an enlarged scale, the wheel assembly and the trivet being shown in a deployed configuration and a stowed configuration, respectively.
Figure 5:
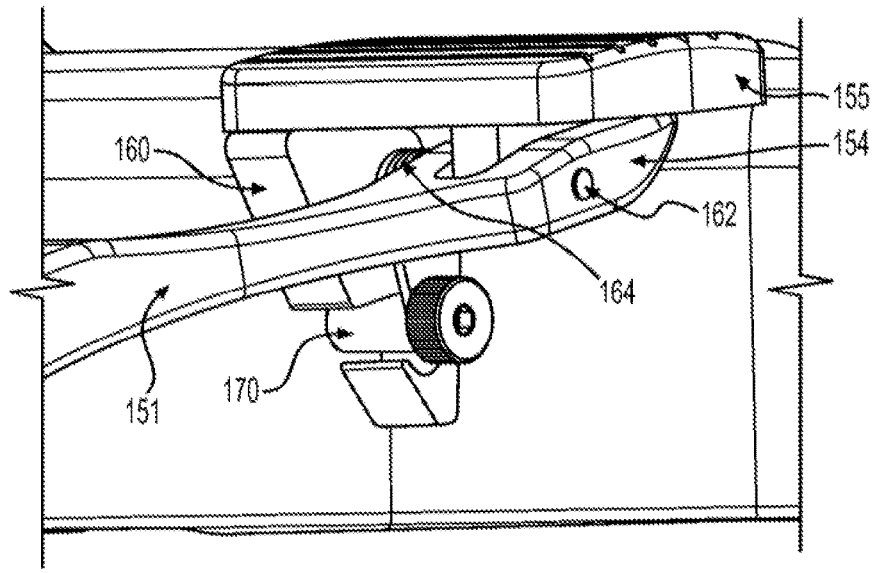
FIG. 5 is a partial isometric view of the stand assembly of FIG. 1, showing a latch assembly in an engaged configuration.

In the embodiment shown, the stand assembly 10 is movable from the stationary configuration to the moveable configuration by moving each of the trivets 50 from a respective deployed configuration to a respective stowed configuration. In some embodiments, as shown in FIG. 4, the distal end 54 of each trivet 50 is positioned within a diameter of the wheels 22 of the wheel assembly 20 when the trivet 50 is in the stowed configuration. In this way, ground clearance is maximized while minimizing travel of the trivets 50 and/or the wheel assemblies 20.

Referring back to FIGS. 2 and 3, the embodiment shown includes a linkage assembly 100 for moving the wheel assemblies 20 towards their respective deployed configurations. In some embodiments, the linkage assembly 100 includes a center plate 113 and a plurality of linkage arms 114 extending from the center plate 113 towards a respective wheel assembly 20. In some embodiments, the center plate 113 is associated with the center hub 13 of the base 12, such as by being positioned within a void defined by the same. In some embodiments, each linkage arm 114 is associated with a respective base arm 14, such as by extending along a length of the same.

In the embodiment shown, each linkage arm 114 includes a proximal end engaged with the center plate 113, a center region pinned to a respective base arm 14 via a linkage pin 115, and a distal end engaged with a respective wheel assembly 20. In such embodiments, the linkage assembly is configured such that a vertical upward force applied to the center of the center plate 113 causes the proximal end of each linkage arm 114 to be biased upwards, thereby causing the distal end of each linkage arm 114 to be biased downwards. In this way, applying sufficient vertical upward force to the center plate 113 while the stand assembly 10 is in a stationary configuration will cause the wheel assemblies 20 to move towards their respective deployed configurations, thereby causing the stand assembly 10 to move towards its moveable configuration. Similarly, applying sufficient vertical upward force to the center plate 113 when the stand assembly 10 is in the movable configuration will prevent or otherwise inhibit the wheel assemblies 20 from moving away from their respective deployed configurations, thereby preventing or otherwise inhibiting the stand assembly 10 from moving away from its moveable configuration.

In some embodiments, one or more wheel assembly 20 includes an engagement plate 28, such as a washer or the like, for providing an engagement surface or other feature by which a load can be transferred from a respective linkage arm 114 into the wheel assembly 20. In some embodiments, the engagement plate 28 is positioned at or near a top end of the carriage 25. In some embodiments, at least one trivet 50 extends through the distal end of a respective linkage arm 114 such that the linkage arm 114 applies loads to the wheel assembly 20 evenly on either side of the trivet 50. In some embodiments, the distal end of the linkage arm 114 defines a curved edge, thereby facilitating proper engagement between the linkage arm 114 and the wheel assembly 20.

In some embodiments, one or more wheel assembly 20 includes one or more guide member 26, such as a bushing or the like, for facilitating movement of the carriage 25 along a length of the trivet 50. In some embodiments, the wheel assembly 20 includes a first guide member 26 positioned at or near a first end of the carriage 25, such as at or near a top end of the wheel assembly 20, and a second guide member 26 displaced therefrom, such as at or near a second and/or bottom end of the carriage 25. In some embodiments, the carriage 25 defines one or more aperture through which the trivet 50 extends. In some such embodiments, one or more guide member 26, such as, e.g., a bushing, is positioned within and/or defines at least part of the one or more aperture.

In some embodiments, one or more trivet 50 extends through the base 12 and/or includes a proximal end 52 that is otherwise accessible, such as to facilitate adjustment of the trivet 50. In some embodiments, one or more trivet 50 includes a stop member 55, such as a retaining ring or the like, that is configured to prevent or otherwise inhibit a respective wheel assembly 20 from becoming disengaged from (e.g., slipping through) the trivet 50. Referring to FIG. 4, the stop member 55 shown is positioned adjacent to the distal end of a trivet and is configured to selectively interface with a guide member (e.g., bushing) 26 of the wheel assembly in the event the wheel assembly 20 moves beyond the deployed configuration, such as if at least part of the stand assembly 10 is raised off of the floor such that gravity causes the carriage to move towards the distal end of the trivet 50. In some embodiments, the stop member 55 is removable or otherwise adjustable so as to facilitate removal of a respective wheel assembly 20, such as for replacing a damaged wheel assembly 20 and/or for changing wheel sizes.

Turning again to FIGS. 2 and 3, and now to FIGS. 5-8, in some embodiments, the linkage assembly 100 includes a foot pedal assembly 150 for allowing a user to selectively move the stand assembly 10 from the stationary configuration to the movable configuration, such as by applying a downward force on the foot pedal assembly. In some embodiments, the foot pedal assembly 150 includes a pedal arm 151 having a proximal end 152 that is pinned to the base 12, such as via a center pin 115 or the like that functions as a fulcrum to a lever, and a distal end 154 displaced therefrom, thereby providing the user with a mechanical advantage for changing the configuration of the stand assembly 10.

In some embodiments, the linkage assembly includes a latch 160 or other means (such as a ratcheting mechanism or the like shown in U.S. patent Ser. No. 16/112,299, the entire disclosure of which is incorporated herein by reference). In some embodiments, the latch 160 is configured to selectively engage with an engagement member 170, such as a pin or the like, thereby moving the latch assembly to an engaged configuration. In some embodiments, moving the latch assembly 160 to an engaged configuration while the stand assembly 10 is in the moveable configuration prevents the stand assembly 10 from moving away from the moveable configuration, thereby allowing the user to remove the downward (or other) force from the foot pedal assembly 150.

Figure 6:
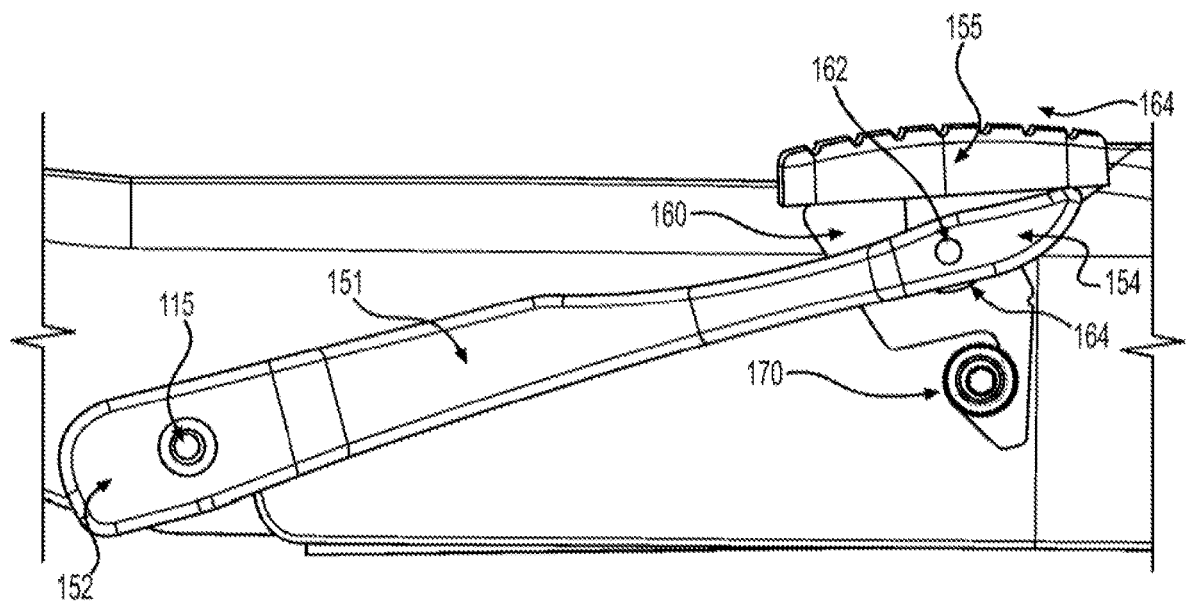
FIG. 6 is a partial side view of the stand assembly of FIG. 1, showing the latch assembly in an engaged configuration.
Figure 7:
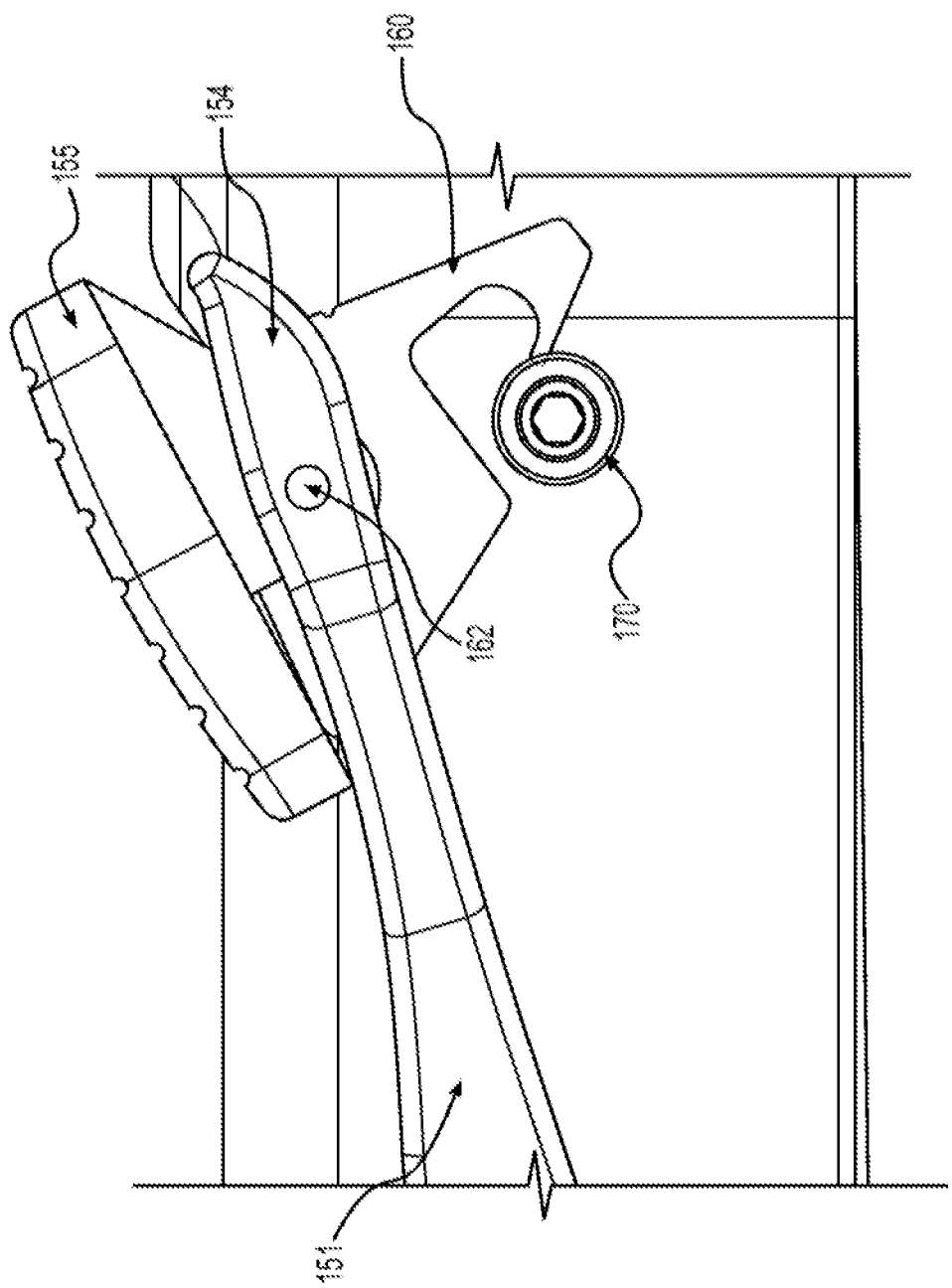
FIG. 7 is a partial side view of the stand assembly of FIG. 1, showing the latch assembly in a disengaged configuration.

In some embodiments, the foot pedal assembly 150 includes a foot pad 155 or the like that is configured for facilitating user interaction with the linkage assembly 100. In some embodiments, the foot pad 155 is positioned at or near the distal end 154 of the pedal arm 151. In some embodiments, the foot pad is capable of being rocked about a pin 162 (i.e., a fulcrum) or otherwise moved relative to the pedal arm 151, such as to selectively engage with the latch assembly 160, as shown in FIGS. 6-7. In some embodiments, selectively rocking the foot pad 155 about the pin 162, clockwise to latch, counterclockwise to unlatch, allows the user to move the latch assembly 160 from the engaged configuration to a disengaged configuration, thereby allowing the stand assembly 10 to move away from the moveable configuration. In some embodiments, the latch assembly 160 is biased towards the engaged configuration. In some embodiments, the foot pad 155 or one or more other feature of the linkage assembly 100 is configured to provide the user with a mechanical advantage for moving the latch assembly 160 away from the engaged configuration. In one embodiment, the mechanical advantage is a spring member 164.

Turning to FIG. 3, in some embodiments, the linkage assembly 100 includes a cam assembly 200 coupled to the foot pedal assembly 150 such that movement of the foot pedal assembly 150 results in a corresponding movement of the cam assembly 200. In some embodiments, the cam assembly 200 engages with a first portion 252 of a rocker arm 250, such as a distal end of the same. Here, the proximal end of the first portion 252 of the rocker arm 250 is proximate to the pin 258 fulcrum. In some embodiments, the rocker arm 250 further includes a second portion 254 having a distal end positioned below a center portion of the center plate 113 (here the proximal end is near the fulcrum) and a third portion 256 rotatably pinned to the base 12, the first 252 and second 254 portions extending from opposed sides of the third portion 256, which is proximate to the pin 258. In this way, the linkage assembly 100 provides a mechanical advantage for allowing a user to apply an upward force onto the center plate 113.

Thus, in some embodiments, the mechanism for lifting the base arms 14 and enabling the stand assembly 10 to travel employs a foot pad 155 attached by way of a pin 162 to a pedal arm 151 associated to at least one of the base arms 14 that affects a rocker arm 250 to raise or lower the center plate 113, which, when pressed, transfers motion upward through the center plate 113 to simultaneously lower all of the casters 22s. In some embodiments, the foot pad 155 has a single foot pad design, which, when pressed down, it lowers the casters. In one embodiment, a spring 164 loaded latch 160 opens and springs back to latch onto the post 170. To release the foot pedal 155, the user steps down on the pedal 155, rocks the pedal 155 "back" to push the latch 160 forward and slowly allows the weight of the stand assembly 10 to raise the pedal 155 past the latch post 170.

Figure 8:
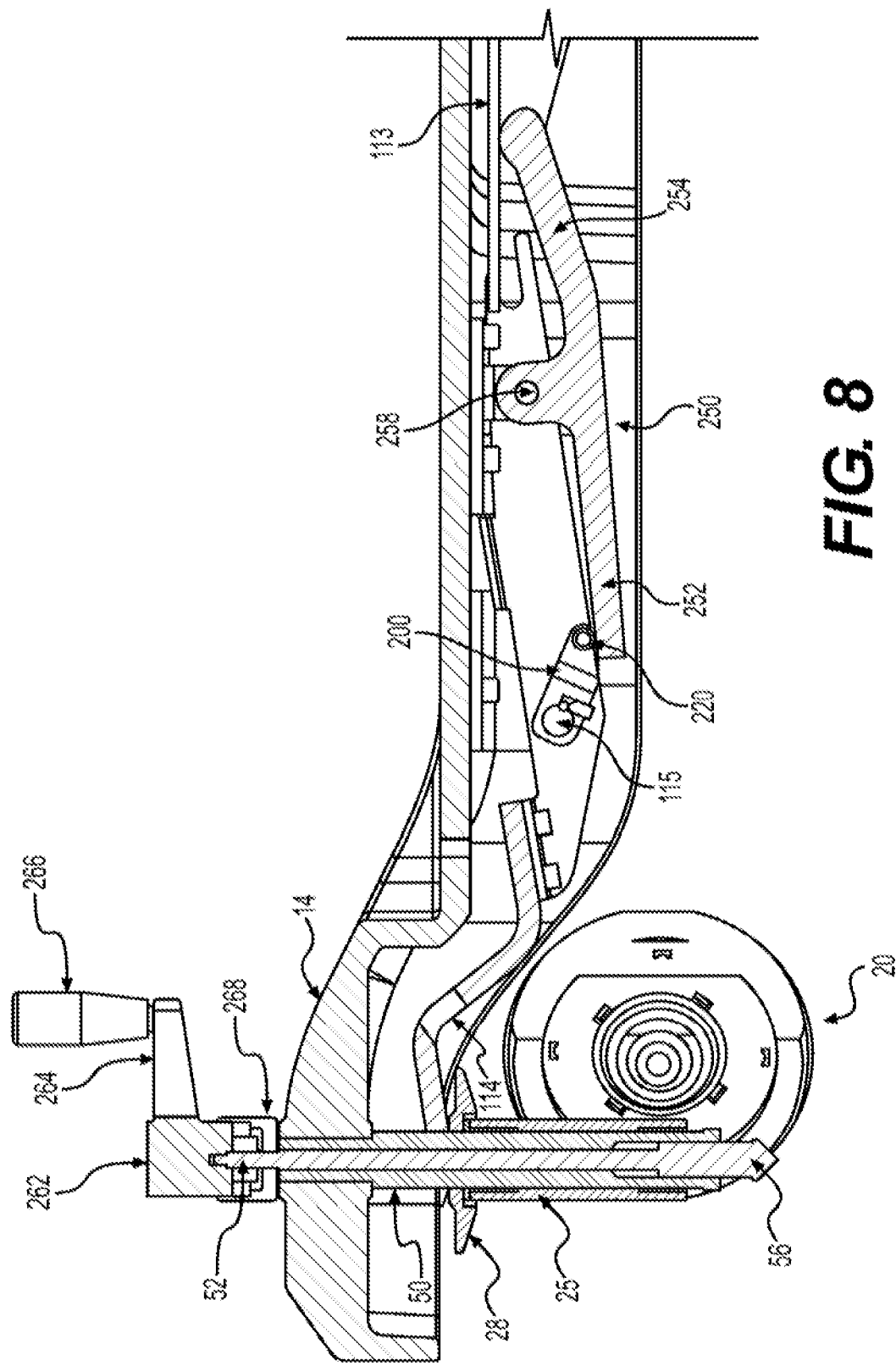
FIG. 8 is a sectional view of the portion of the stand assembly shown in FIG. 2, the wheel assembly and the trivet being shown in a deployed configuration and a stowed configuration, respectively, showing the leveling crank and handle, and without showing pedal assembly on obverse side.

Turning to FIGS. 8-10, in some embodiments, the stand assembly 10 of the present invention includes a plurality of leveling assemblies 260, each one associated with a wheel assembly 20 and located at the proximal end 52 of each trivet 50. In some embodiments, each leveling assembly 260 includes a crank 262 and a jam nut 268, and the trivet 50 includes a trivet outer sleeve 58 and a trivet inner member 57. In some embodiments, each leveling assembly also includes a crank lever 264 and, optionally, a crank handle 266. In one embodiment, by turning the crank handle 266 at the top of each trivet foot 52, torque is transmitted through the trivet inner member 57 to the ball nose trivet 56 and each leg 14 of the stand can be raised or lowered a measure, such as, e.g., approximately ⅛ to 2 inches. This gives the user the ability to level the stand 10 from a slightly unlevel environment. A jam nut 266 directly underneath the crank 262 provides a way to lock the trivet 50 to the adjusted height. Here, the trivet outer sleeve 58 moves through the bushing 26 and carriage 25 of the wheel assembly 20 during engagement and disengagement of the wheels 22.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A stand assembly that is movable between a stationary configuration and a moveable configuration, the stand assembly comprising:
a base comprising a center hub and plurality of base arms extending therefrom;
a plurality of wheel assemblies moveably coupled to said base, each wheel assembly being coupled to a respective base arm; and
a first trivet associated with a first wheel assembly of said plurality of wheel assemblies, said first wheel assembly being slidably engaged with said first trivet;
wherein said first wheel assembly is movable between a deployed configuration and a stowed configuration,
wherein moving said first wheel assembly between the deployed configuration and the stowed configuration comprises sliding said first wheel assembly along said first trivet, thereby moving the first wheel assembly vertically relative to said base, and
wherein moving the stand assembly to the moveable configuration comprises moving said first wheel assembly to the deployed configuration.

2. The stand assembly of claim 1, wherein a distal end of said first trivet is positioned within a diameter of a first wheel of said first wheel assembly when the stand assembly is in the moveable configuration.

3. The stand assembly of claim 1, further comprising a first linkage arm associated with a first base arm of said plurality of base arms, wherein said first trivet extends through a distal end of said first linkage arm.

4. The stand assembly of claim 3, further comprising a center plate positioned at least partially within a void defined by said center hub of said base, wherein said first linkage arm comprises a proximal end engaged with said center plate, and wherein said first linkage arm further comprises a center region connected to said first base arm.

5. The stand assembly of claim 4, wherein said center region of said first linkage arm is connected to said first base arm via a linkage pin such that application of a vertical upward force to said center plate causes said proximal end of said first linkage arm to move upward and said distal end of said first linkage arm downward, and wherein said distal end of said first linkage arm is engaged with said first wheel assembly such that moving said distal end of said first linkage arm downward causes said first wheel assembly to move towards its deployed configuration.

6. The stand assembly of claim 1, wherein the first wheel assembly comprises:
a carriage slidably engaged with the first trivet;
an axel extending from the carriage to the first wheel of the first wheel assembly; and
an engagement plate positioned on a first end of the carriage such that the engagement plate is slidably engaged with the first trivet.

7. The stand assembly of claim 6, wherein the carriage defines a first aperture, and wherein the first trivet extends coaxially through the first aperture.

8. The stand assembly of claim 7, further comprising a first linkage arm associated with a first base arm of said plurality of base arms, wherein said first trivet extends through a distal end of said first linkage arm.

9. The stand assembly of claim 1, further comprising at least one foot pedal assembly associated with one of the plurality of base arms.

10. The stand assembly of claim 9, wherein said foot pedal assembly is movable between a deployed configuration and a stowed configuration.

11. A stand assembly that is movable between a stationary configuration and a moveable configuration, the stand assembly comprising:
- a base comprising a center hub;
- a plurality of wheel assemblies moveably coupled to said base; and
- a first trivet associated with a first wheel assembly of said plurality of wheel assemblies, said first wheel assembly being slidably engaged with said first trivet;
- wherein a distal end of said first trivet is positioned within a diameter of a first wheel of said first wheel assembly when the stand assembly is in the moveable configuration,
- wherein said first wheel assembly is movable vertically relative to said base, thereby facilitating movement of said first wheel assembly between a deployed configuration and a stowed configuration, and
- wherein moving the stand assembly to the moveable configuration comprises moving said first wheel assembly to the deployed configuration.

12. The stand assembly of claim 11, further comprising a first linkage arm having a distal end engaged with said first wheel assembly, wherein said first trivet extends through the distal end of said first linkage arm.

13. The stand assembly of claim 11, wherein the first wheel assembly comprises:
- a carriage slidably engaged with the first trivet;
- an axel extending from the carriage to the first wheel of the first wheel assembly; and
  - an engagement plate positioned on a first end of the carriage such that the engagement plate is slidably engaged with the first trivet.

14. The stand assembly of claim 13, further comprising a first linkage arm having a distal end engaged with said first wheel assembly, wherein the carriage defines first and second apertures, and wherein the first trivet extends coaxially through said distal end of said linkage arm and through said first and second apertures of said carriage.

15. The stand assembly of claim 14, wherein the carriage comprises a first guide member positioned at the first end of the carriage and defining said first aperture, and a second guide member positioned at a second end of the carriage and defining said second aperture.

16. The stand assembly of claim 15, wherein the first trivet comprises a stop member positioned adjacent to said distal end of the first trivet, and wherein the stop member is configured to selectively interface with the second guide member.

17. A stand assembly that is movable between a stationary configuration and a moveable configuration, the stand assembly comprising:
- a base comprising a center hub and plurality of base arms extending therefrom;
- a plurality of wheel assemblies, each wheel assembly being moveably coupled to a respective base arm;
- a center plate associated with said center hub; and
- a linkage assembly comprising a plurality of linkage arms, each linkage arm comprising a proximal end engaged with said center plate and a distal end engaged with a respective wheel assembly,
- wherein application of a vertical upward force to said center plate causes respective proximal ends of each linkage arm to move upward and respective distal ends of each linkage arm downward, therefore moving each wheel assembly of the plurality of wheel assemblies from a stowed configuration to a deployed configuration, and
- wherein moving the stand assembly to the moveable configuration comprises moving each wheel assembly of said plurality of wheel assemblies to its deployed configuration.

18. The stand assembly of claim 17, further comprising a plurality of trivets, wherein each trivet of said plurality of trivets extends through the distal end of a respective linkage arm.

19. The stand assembly of claim 17, further comprising a plurality of trivets, each trivet associated with one of said wheel assemblies.

20. The stand assembly of claim 19, wherein each of said wheel assemblies is slidably engaged with said respective trivet.

* * * * *